Patented Jan. 7, 1930

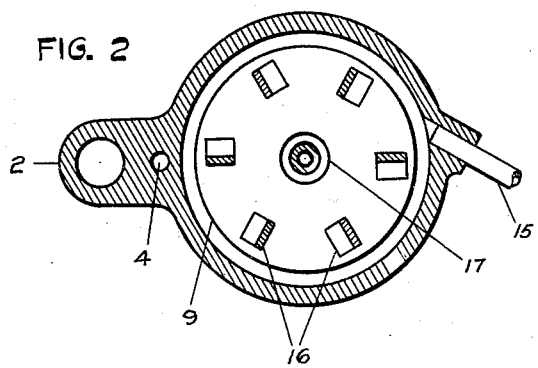
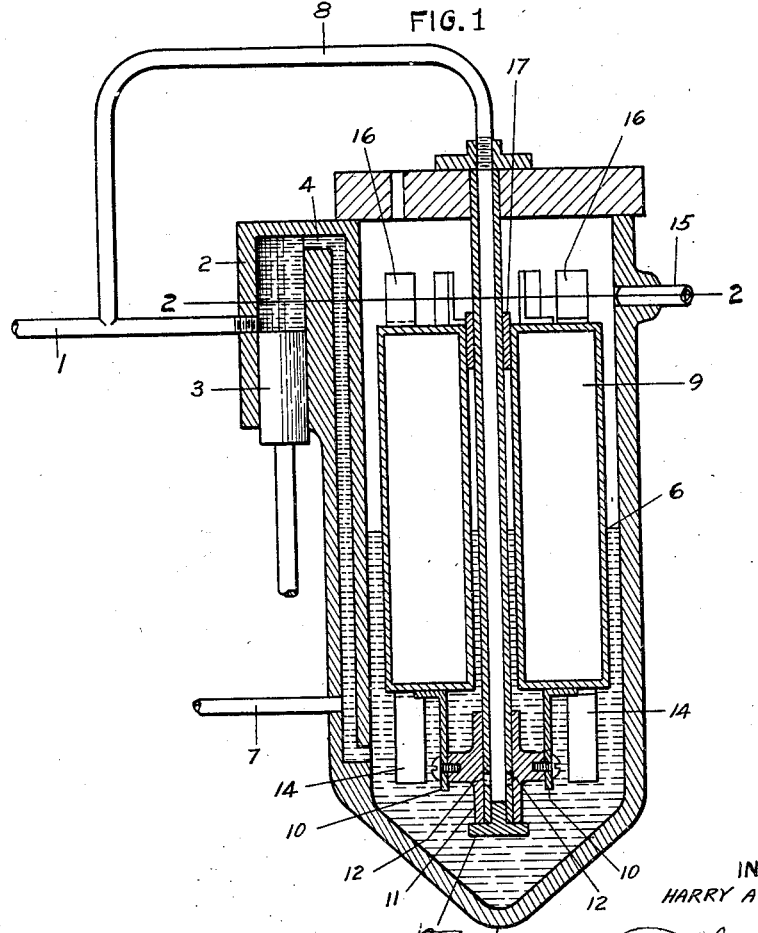

1,742,459

UNITED STATES PATENT OFFICE

HARRY A. COWARDIN, OF MARION, OHIO, ASSIGNOR OF ONE-HALF TO SAMUEL P. COWARDIN, OF RICHMOND, VIRGINIA

OIL-SUPPLY-CONTROLLING DEVICE

Application filed January 20, 1928. Serial No. 248,263.

My invention relates to an oil supply controlling device for an oil engine.

The object of my invention is to keep the reservoir of fuel oil for supplying the engine at a constant level, and to prevent the automatic regulating means for supplying the fuel from sticking, with consequent disastrous results to the operation of the engine.

It is a further object to prevent leakage in the oil tank, which is under pressure.

It is a further object to eliminate devices which leak, such as needle valves, cocks and the like.

Referring to the drawings:

Figure 1 is a vertical section through the apparatus of my invention.

Figure 2 is a section on the line 2—2 of Figure 1.

Referring to the drawings in detail, 1 is a pipe from the source of supply of fuel. This pipe communicates with a pump cylinder 2, in which a pump piston 3 operates, being actuated by any suitable source of power, as from the camshaft to the engine. The oil thus drawn into the system from the oil supply is delivered through the passageway 4 to the bottom of the oil reservoir 5. It is desired to maintain the oil at about the level indicated at 6.

In this oil reservoir is mounted a fuel delivery pipe 7 and an oil overflow pipe 8, so that if the oil rises above the level 6 in the reservoir 5 it will be by-passed back to the supply line and simply recirculated. This results in a constant fuel supply being on hand at all times in the reservoir for the engine.

In the reservoir is mounted a float 9 which has depending arms 10 that engage a sleeve 11 that acts as a valve sleeve for regulating the overflow ports 12 in the overflow pipe 8. The shoulder 13 on this pipe 8 limits the downward movement of the float, while the upward movement of the float is controlled by the amount of oil which may go into the reservoir. To prevent sticking of such a valve, with consequent disastrous results, I have provided a series of depending vanes 14 from the bottom of the float 9, which are engaged by the current of incoming oil, which causes the float to rotate thus preventing sticking. The vanes 14 are arranged on the bottom of the float 9 at such an angle that when the oil enters the reservoir from passageway 4 it strikes these vanes and produces a rotation of the float and thereby prevents any sticking of the float to the overflow pipe.

I also deliver to the top of the float in the top of the reservoir chamber by the pipe 15, compressed air from any suitable source, which engages with the vanes 16, likewise causing the float to rotate. The sole purpose of the introduction of compressed air through the pipe 15 is to rotate the float. After the air has been used for the purpose of rotating the float it passes out through an opening in the upper part of the oil reservoir. The float is supported in rotatable position on the pipe 8 through the bearing 17.

Through the operation of the pump 3 the oil is forced through the passageway 4 from the inlet pipe 1 into the reservoir, whence it is conveyed to the engine through pipe 7 as needed. Under normal working conditions the oil is maintained at the point indicated by the numeral 6. If the oil should reach a point higher than that indicated by the numeral 6 the float 9 is raised by the oil so that the sleeve 11 is raised on the lower end of the overflow pipe sufficiently to open the overflow ports 12 so that the surplus oil in the reservoir may then pass out through the overflow pipe back into the inlet pipe 1, and is reconveyed into the reservoir. This rotation of the oil prevents any additional oil being forced into the reservoir so that the oil in the reservoir is reduced to its normal position, indicated by the numeral 6.

I desire to comprehend within my invention such modifications as may be clearly embraced within my claims and the scope of my invention.

Having thus fully described my invention, what I claim is new and desire to secure by Letters Patent, is:

1. In combination, inlet means to supply a reservoir, a reservoir, an exit line in said reservoir, an overflow line for said reservoir extending from the lower part of said reservoir to the inlet means, a float means in said reservoir and surrounding said overflow line adapted to open and close said overflow line depending upon the height of the fluid in the reservoir.

2. In combination, means to supply a reservoir, a reservoir, an exit line in said reservoir, an overflow line for said reservoir, a float means in said reservoir adapted to open and close said overflow line depending upon the height of the fluid in the reservoir, and means on said float in said reservoir for causing the float to rotate by the engagement of the incoming fluid therewith.

3. In combination, means to supply a reservoir, a reservoir, an exit line in said reservoir, an overflow line for said reservoir, a float means in said reservoir adapted to open and close said overflow line depending upon the height of the fluid in the reservoir, means on said float in said reservoir for causing the float to rotate by the engagement of the incoming fluid therewith, means to supply compressed air for said reservoir, and means on said float adapted to be acted upon by said compressed air to rotate said float.

4. In combination, means to supply a reservoir, a reservoir, an exit line in said reservoir, an overflow line for said reservoir, a float means in said reservoir adapted to open and close said oveflow line depending upon the height of the fluid in the reservoir, means to supply air under pressure to said reservoir, and means on said float adapted to be engaged thereby to cause the float to rotate.

5. In combination, means to supply a reservoir, a reservoir, an exit line in said reservoir, an overflow line for said reservoir, a float means in said reservoir adapted to open and close said overflow line depending upon the height of the fluid in the reservoir, means to supply air under pressure to said reservoir, means on said float adapted to be engaged thereby to cause the float to rotate, and means permitting the escape of air from said reservoir as supplied.

6. In combination, a supply line, means to draw fuel through the supply line and deliver it to a reservoir, a reservoir, means to supply fuel therefrom to an engine, an overflow line from said reservoir into the supply line, valve means slidably mounted around the overflow line for controlling said overflow line, and a float connected to said valve means.

7. In combination, a supply line, means to draw fuel through the supply line and deliver it to a reservoir, a reservoir, means to supply fuel therefrom to an engine, an overflow line from said reservoir into the supply line, valve means for controlling said overflow line, a float connected to said valve means, and vanes on said float arranged in the path of the incoming fuel to cause said float to rotate with its valve means while the quantity of liquid in the reservoir will cause the float valve and vanes to reciprocate to open and close the overflow line to maintain a constant level of fuel in the reservoir.

8. In combination, a supply line, means to draw fuel through the supply line and deliver it to a reservoir, a reservoir, means to supply fuel therefrom to an engine, an overflow line from said reservoir into the supply line, valve means for controlling said overflow line, a float connected to said valve means, vanes on said float arranged in the path of the incoming fuel to cause said float to rotate with its valve means while the quantity of liquid in the reservoir will cause the float valve and vanes to reciprocate to open and close the overflow line to maintain a constant level of fuel in the reservoir, means to supply compressed air to the top of the reservoir, vanes on said float actuated thereby for rotating the float, and means for conveying away air from the top of the reservoir.

9. In an oil supply controlling device, a reservoir, an oil supply line and an exit line therefor, an overflow line extending from within said reservoir and out of said reservoir to said supply line, and means surrounding said overflow line and operated by the oil in the reservoir to permit the flow of oil through said overflow line.

10. In an oil supply controlling device, a reservoir, an oil supply line and an exit line therefor, an overflow line for said reservoir, said overflow line being closed at one end and provided with a port in the side thereof, and an oil actuated sleeve adapted to open and close said port to permit the by-passing of the oil through said overflow line.

11. In an oil supply controlling device, a reservoir, an oil supply line and an exit line therefor, an overflow line for said reservoir connected to said oil supply line, a float means rotatably supported on said overflow line and adapted to control the flow of oil from the reservoir through the overflow line back to the supply line, and means on the float adapted to be engaged by the current of oil entering through the supply line to rotate the float and prevent its sticking.

In testimony whereof, I affix my signature.

HARRY A. COWARDIN.